(12) United States Patent
Yamada

(10) Patent No.: US 12,115,573 B2
(45) Date of Patent: Oct. 15, 2024

(54) BENDING SYSTEM AND GREASING UNIT

(71) Applicant: AMADA CO., LTD., Kanagawa (JP)

(72) Inventor: Hideto Yamada, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 267 days.

(21) Appl. No.: 17/766,363

(22) PCT Filed: Oct. 7, 2020

(86) PCT No.: PCT/JP2020/037948
§ 371 (c)(1),
(2) Date: Apr. 4, 2022

(87) PCT Pub. No.: WO2021/070846
PCT Pub. Date: Apr. 15, 2021

(65) Prior Publication Data
US 2023/0271243 A1     Aug. 31, 2023

(30) Foreign Application Priority Data
Oct. 11, 2019   (JP) ................... 2019-187798

(51) Int. Cl.
*B21D 37/18*   (2006.01)
*B21D 5/02*    (2006.01)
(Continued)

(52) U.S. Cl.
CPC .......... *B21D 37/18* (2013.01); *B21D 5/0236* (2013.01)

(58) Field of Classification Search
CPC ...... B21D 37/18; B21D 37/04; B21D 5/0236; B21D 5/02; B21D 5/0254; F16N 1/00; F16N 11/00; F16N 11/08
See application file for complete search history.

(56) References Cited

U.S. PATENT DOCUMENTS 6,098,755 A * 8/2000 Wyssmann ............... F16N 7/00
184/22
2003/0064871 A1   4/2003 Akami
(Continued)

FOREIGN PATENT DOCUMENTS

DE        102006031704 A1   1/2008
DE            10119248 A1   10/2022
(Continued)

OTHER PUBLICATIONS

English translate (WO2015198294A1), retrieved date Apr. 9, 2024.*
(Continued)

*Primary Examiner* — Mohammed S. Alawadi
(74) *Attorney, Agent, or Firm* — Renner, Otto, Boisselle & Sklar, LLP

(57) ABSTRACT

A bending system includes a greasing unit configured to move in a right-left direction by way of a moving operation of an external operation member and to supply grease to a sliding contact part of a tool holder, and a greasing unit holder provided on one side in a right-left direction of a table and configured to support the greasing unit. The greasing unit includes a greasing unit main body, and an application member provided on the greasing unit main body and formed in a shape corresponding to the sliding part of the tool holder, the application member being configured to be able to be impregnated with the grease.

8 Claims, 12 Drawing Sheets

(51) Int. Cl.
*B21D 37/04* (2006.01)
*F16N 1/00* (2006.01)
*F16N 11/08* (2006.01)

(56) References Cited

U.S. PATENT DOCUMENTS

| | | | |
|---|---|---|---|
| 2014/0326036 A1 | 11/2014 | Hayashi | |
| 2016/0354821 A1* | 12/2016 | Meneghetti | ............ B21D 5/004 |
| 2017/0297073 A1 | 10/2017 | Sato | |

FOREIGN PATENT DOCUMENTS

| | | | |
|---|---|---|---|
| EP | 1160024 A1 | 12/2001 | |
| JP | 4672868 B2 | 4/2011 | |
| JP | 5841800 B2 | 1/2016 | |
| JP | 5947861 B2 | 7/2016 | |
| WO | WO-2015198294 A1 * | 12/2015 | ........... B21D 5/0254 |

OTHER PUBLICATIONS

International Search Report for corresponding Application No. PCT/JP2020/037948, mailed Nov. 10, 2020.
Written Opinion for corresponding Application No. PCT/JP2020/037948, mailed Nov. 10, 2020.
Extended European Search Report for corresponding EP Application No. 20873680.1 dated Nov. 4, 2022.

* cited by examiner

BENDING SYSTEM AND GREASING UNIT

TECHNICAL FIELD

The present disclosure relates to a bending system for bending a plate-shaped workpiece, and a greasing unit for suppling grease to a sliding contact part that is a part of a tool holder of a press brake and is in sliding contact with the tool.

BACKGROUND ART

A bending system includes a tool storage that is arranged on a side of a press brake and stores a plurality of tools. The tool storage includes a plurality of stockers that retain the plurality of tools, and a certain selected stocker is configured to be able to be positioned at a change position for changing the tool. In addition, the bending system includes a tool change unit that changes the tool with respect to the tool holder and the stocker positioned at the change position of the press brake, and the tool change unit is provided on the back side of a table of the press brake so that it can be moved in the left-right direction. The tool change unit includes a tool retention member that retains the tool by being engaged with an engagement hole of the tool. The bending system includes a servo motor as a moving actuator that moves the tool change unit in the left-right direction (see Patent Literature 1 and Patent Literature 2).

It should be noted that there is a prior art related to the present disclosure shown in Patent Literature 3, in addition to the ones shown in Patent Literature 1 and Patent Literature 2.

CITATION LIST

Patent Literature

Patent Literature 1: Japanese Patent No. 4672868
Patent Literature 2: Japanese Patent No. 5947861
Patent Literature 3: Japanese Patent No. 5841800

SUMMARY

When the tool is changed by the tool change unit, a part of the tool holder may come into sliding contact with the tool. When there is an increased number of sliding contacts (an increased sliding contact frequency) of the sliding contact part that is a part of the tool holder and is in sliding contact with the tool, the sliding contact part of the tool holder may be worn to the extent that the processing accuracy is affected. On the other hand, in order to suppress the wear of the sliding contact part of the tool holder, it is possible to apply, with a brush, grease to the sliding contact part of the tool holder. However, the grease application work is extremely troublesome and time-consuming, and there is a concern that variation may occur in an application state (an applied surface) of the grease. In other words, there is a problem in that it is difficult to sufficiently prevent the sliding contact part of the tool holder from being worn while simplifying the work of applying the grease to the sliding contact part of the tool holder.

An object of the present disclosure is to provide a bending system and a greasing unit that enable easy application of grease to a sliding contact part of a tool holder while suppressing variation in a grease application state.

According to a first aspect of one or more embodiments, there is provided a bending system that includes a greasing unit configured to move in a left-right direction by way of a moving operation of an external operation member and to supply grease to a sliding contact part that is a part of a tool holder of a press brake and is in sliding contact with a tool, and a greasing unit holder provided on one side in a left-right direction of a table of the press brake and configured to support the greasing unit, in which the greasing unit includes a greasing unit main body, and an application member provided on the greasing unit main body and formed in a shape corresponding to the sliding contact part of the tool holder, the application member being configured to be able to be impregnated with the grease and configured to apply the grease to the sliding contact part of the tool holder.

According to the first aspect, while the application member is brought into contact with the sliding contact part of the tool holder, the greasing unit holder is moved, by way of the moving operation of the external operation member, to one side in the left-right direction of the table from the other side in the left-right direction of the table or from the one side in the left-right direction of the table to the other side in the left-right direction of the table. As a result, the grease can be easily applied to the sliding contact part of the tool holder while suppressing variation in a grease application state.

According to a second aspect of one or more embodiments, there is provided a greasing unit that includes a greasing unit main body and an application member provided on the greasing unit main body and formed in a shape corresponding to a sliding contact part, the sliding contact part being a part of a tool holder of a press brake and being in sliding contact with a tool, the application member being configured to be able to be impregnated with grease and configured to apply the grease to the sliding contact part of the tool holder.

According to the second aspect, while the application member is brought into contact with the sliding contact part of the tool holder, the greasing unit holder is moved from one side in the left-right direction of a table of the press brake to the other side in the left-right direction of the table, or is moved from the other side in the left-right direction of the table of the press brake to the one side in the left-right direction of the table. As a result, the grease can be easily applied to the sliding contact part of the tool holder while suppressing variation in a grease application state.

According to the present embodiment, it is possible to sufficiently prevent the sliding contact part of the tool holder from being worn while simplifying the work of applying the grease to the sliding contact part of the tool holder.

DESCRIPTION OF EMBODIMENTS

Figure 1:
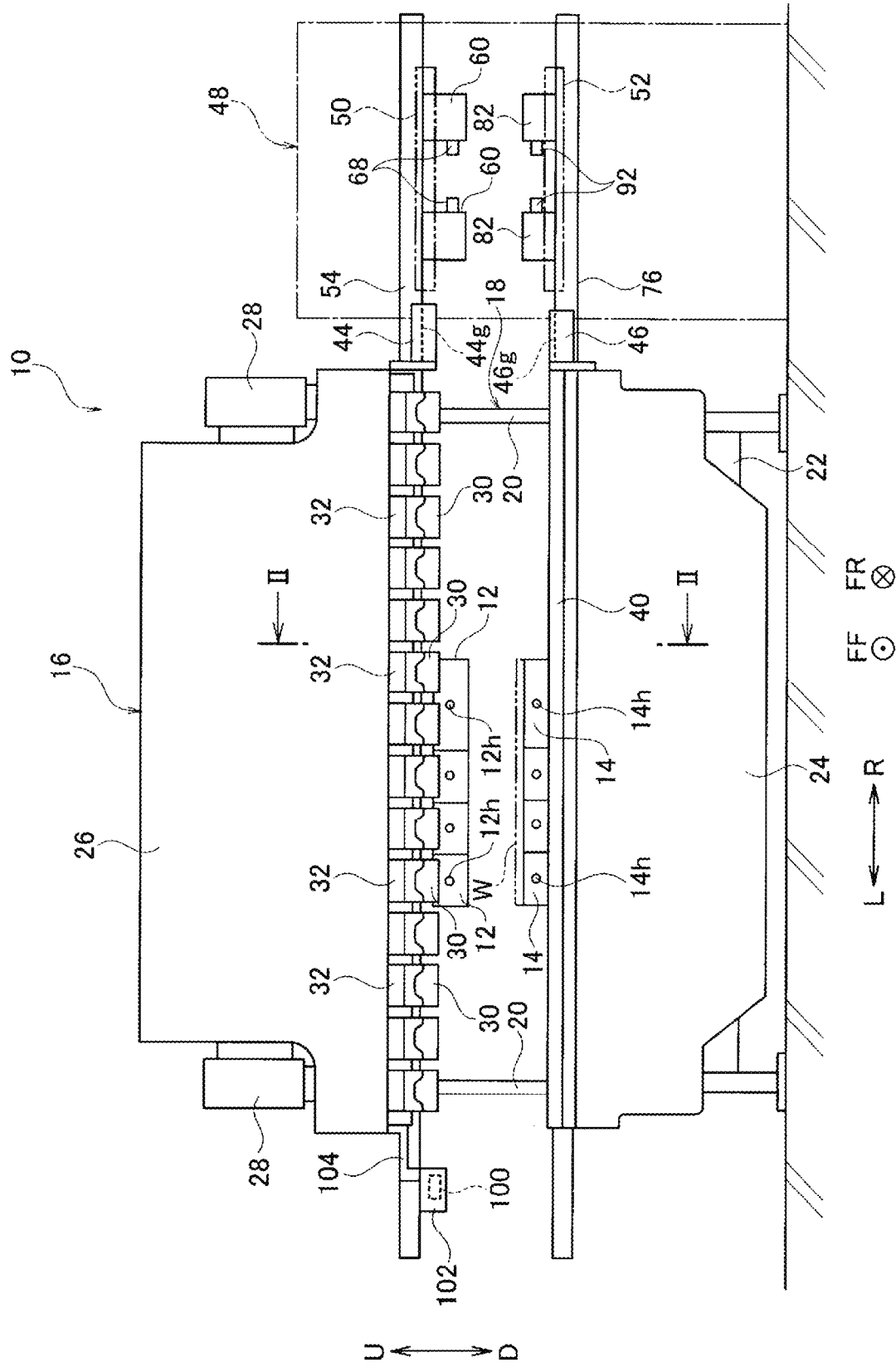
FIG. 1 is a schematic front view of a bending system according to the present embodiment.

Hereinafter, the present embodiment and the modification thereof will be described with reference to FIGS. 1 to 12.

It should be noted that in the description and the claims of the present application, "provided" is meant to include being indirectly provided via another member in addition to being directly provided. The "left-right direction" is one of the horizontal directions and refers to a lateral direction of the press brake. The "front-back direction" is a horizontal direction orthogonal to the left-right direction, and refers to a depth direction of the press brake. The "tool" is meant to include an upper tool and a lower tool. In the drawings, "FF" indicates the forward direction, "FR" indicates the backward direction, "L" indicates the left direction, "R" indicates the right direction, "U" indicates the upward direction, and "D" indicates the downward direction.

Figure 2:
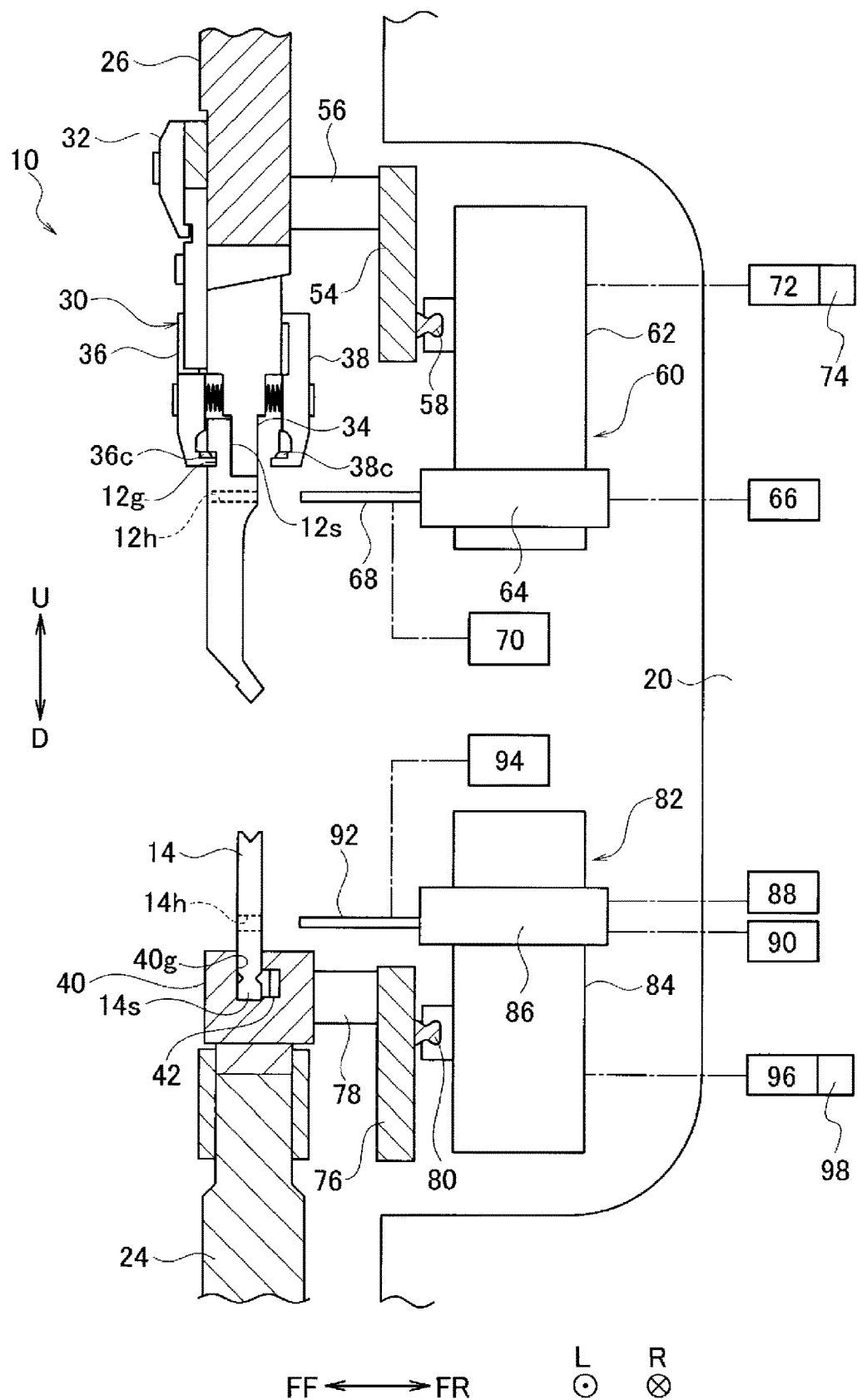
FIG. 2 is a cross-sectional view taken along the line II-II in FIG. 1.

As shown in FIGS. 1 and 2, a bending system 10 according to the present embodiment is a system for bending a plate-shaped workpiece (sheet metal) W by using a punch tool 12 as an upper tool and a die tool 14 as a lower tool, both of which are automatically changeable. Here, an engagement hole 12h is formed through the central portion in the lateral direction of the punch tool 12, and an engagement groove 12g for drop prevention is formed at a shank 12s as a base portion of the punch tool 12 (see FIG. 2). An engagement hole 14h is formed through the central portion in the lateral direction of the die tool 14 (see FIG. 2). It should be noted that the engagement hole 12h of the punch tool 12 and the engagement hole 14h of the die tool 14 are each shown in a circular hole shape, but the shape thereof is not limited to the circular hole shape and may be an elongated hole shape.

The bending system 10 includes a press brake 16 that bends the workpiece W by the cooperation of the punch tool 12 and the die tool 14. First, the configuration of the press brake 16 will be specifically described.

The press brake 16 includes a main frame 18, and the main frame 18 includes a pair of side plates 20 that are separated and opposed to each other in the left-right direction, and a plurality of connecting members 22 that connect the pair of side plates 20. Further, a lower table 24 extending in the left-right direction is provided on the lower part of the main frame 18. An upper table 26 extending in the left-right direction is provided on the upper part of the main frame 18 so as to be vertically movable. A hydraulic cylinder 28 is provided on the upper part of each of the side plates 20 as a vertically moving actuator for vertically moving the upper table 26. Note that instead of configuring the upper table 26 so as to be vertically movable, the lower table 24 may be configured to be vertically movable. Instead of the hydraulic cylinder 28, a servo motor (not shown) may be used as the vertically moving actuator.

As shown in FIGS. 1 to 4, at the lower end portion of the upper table 26, a plurality of upper tool holders 30, each of which retains the punch tool 12 so as to be installable and removable, are provided at intervals in the left-right direction via fixture plates (fastening plates) 32. Each of the upper tool holders 30 has a known configuration, for example, shown in Patent Literature 3 and includes a holder main body 34. On the front side of each of the holder main bodies 34, a front clamp plate 36 that clamps the shank 12s of the punch tool 12 is provided so as to be swingable. On the lower end side thereof, each of the front clamp plates 36 includes a pawl 36c that can be engaged with the engagement groove 12g for preventing the punch tool 12 from dropping. Further, on the rear side of each of the holder main bodies 34, a rear clamp plate 38 that clamps the shank 12s of the punch tool 12 whose front and back sides are inverted is provided so as to be swingable. On the lower end side thereof, each of the rear clamp plates 38 includes a pawl 38c that can be engaged with the engagement groove 12g for preventing the punch tool 12 from dropping. Here, a lower end surface 34u of each of the holder main bodies 34, a front surface 34f on the lower end side thereof, a rear surface 34r on the lower end side thereof, a rear surface 36r on the lower end side of each of the front clamp plates 36, and a front surface 38f on the lower end side of each of the rear clamp plates 38 are sliding contact parts that are in sliding contact with the punch tool 12 in the upper tool holder 30.

It should be noted that clamping operations and unclamping operations of the plurality of front clamp plates 36 are respectively performed in synchronization with each other. Therefore, even when the front clamp plate 36 unclamps the punch tool 12, the punch tool 12 does not drop from the upper tool holder 30. In the same manner, clamping operations and unclamping operations of the plurality of rear clamp plates 38 are respectively performed in synchronization with each other. Therefore, even when the rear clamp plate 38 unclamps the punch tool 12, the punch tool 12 does not drop from the upper tool holder 30.

As shown in FIGS. 1 and 2, a lower tool holder 40 that retains the die tool 14 so as to be installable and removable is provided on the upper side of the lower table 24, and the lower tool holder 40 extends in the left-right direction. The lower tool holder 40 has a known configuration, for example, shown in Patent Literature 1, and a holder groove 40g for causing a shank 14s of the die tool 14 to be inserted into is formed along the left-right direction thereof. The lower tool holder 40 includes a clamper 42 that fixes (presses) the shank 14s of the die tool 14. Here, the inner surface of the holder groove 40g of the lower tool holder 40 is a sliding contact part that is in sliding contact with the die tool 14 in the lower tool holder 40.

As shown in FIGS. 1 and 2, an upper joint block 44 extending in the left-right direction is provided on the right side portion of the upper table 26. On the upper joint block 44, a joint groove 44g for causing the shank 12s of the punch tool 12 to be inserted into is formed along the left-right direction thereof. The joint grooves 44g of the upper joint block 44 are each arranged in series along the left-right direction in a gap between the holder main body 34 and the front clamp plate 36 in the plurality of upper tool holders 30. Here, the inner surface of the joint groove 44g of the upper joint block 44 is a sliding contact part that is in sliding contact with the punch tool 12 in the upper joint block 44. The sliding contact part of the upper joint block 44 is formed in a shape similar to that of the sliding contact part of each of the upper tool holders 30.

As shown in FIGS. 1 and 2, a lower joint block 46 extending in the left-right direction is provided on the right side portion of the lower table 24. On the lower joint block 46, a joint groove 46g for causing the shank 14s of the die tool 14 to be inserted into is formed along the left-right direction thereof. The joint groove 46g of the lower joint block 46 is connected to the holder groove 40g of the lower tool holder 40. Here, the inner surface of the joint groove 46g of the lower joint block 46 is a sliding contact part that is in sliding contact with the die tool 14 in the lower joint block 46. The sliding contact part of the lower joint block 46 is formed in a shape similar to that of the sliding contact part of the lower tool holder 40.

As shown in FIG. 1, on the side in the left-right direction of the press brake 16 (an example of the vicinity of the press brake 16), a tool storage 48 that stores a plurality of punch tools 12 and a plurality of die tools 14 is arranged. The tool storage 48 has the same configuration as the known configuration, for example, shown in Patent Literature 1 and Patent Literature 2. The configuration of the tool storage 48 will be briefly described as follows.

The tool storage 48 includes a plurality of upper stockers 50 (only one is shown) that retain the plurality of punch tools 12. Although only the upper stocker 50 positioned at an upper change position for changing the punch tool 12 is shown, the plurality of upper stockers 50 are arranged along the front-rear direction. A certain selected upper stocker 50 is configured to be able to be positioned at the upper change position by an upper stocker moving mechanism (not shown).

The tool storage 48 includes a plurality of lower stockers 52 (only one is shown) that retain the plurality of die tools 14. Although only the lower stocker 52 positioned at a lower change position for changing the die tool 14 is shown, the plurality of lower stockers 52 are arranged along the front-rear direction. A certain selected lower stocker 52 is configured to be able to be positioned at the lower change position by a lower stocker moving mechanism (not shown).

As shown in FIG. 2, on the back side (rear side) of the upper table 26, an upper beam member 54 extending in the left-right direction is provided via a plurality of brackets 56 (only one is shown). On the back surface (rear surface) of the upper beam member 54, an upper guide rail 58 extending in the left-right direction is provided. On the upper guide rail 58, a pair of upper tool change units 60, which change the punch tools 12 with respect to the plurality of upper tool holders 30, and the upper stocker 50 positioned at the upper change position are provided so as to be movable in the left-right direction. In other words, the pair of upper tool change units 60 are provided on the back side of the upper table 26 via the upper beam member 54 and the upper guide rail 58 so as to be movable in the left-right direction. Each of the upper tool change units 60 transports the punch tool 12 between the upper tool holder 30 and the upper stocker 50 positioned at the upper change position. Hereinafter, the pair of upper tool change units 60 may be distinguished and referred to as the first upper tool change unit 60 and the second upper tool change unit 60.

Each of the upper tool change units 60 has the same configuration as the known configuration shown in Patent Literature 1. Each of the upper tool change units 60 includes an upper unit main body 62 provided on the upper guide rail 58 so as to be movable in the left-right direction, and an upper support member 64 provided on the upper unit main body 62 so as to be movable in the front-rear direction. Each of the upper support members 64 moves in the front-rear direction with respect to each of the upper unit main bodies 62 by way of driving of an air cylinder 66 as a front-rear moving actuator provided at an appropriate position of each of the upper unit main bodies 62. Note that the upper support member 64 may be configured to be vertically movable with respect to the upper unit main body 62.

Each of the upper tool change units 60 includes an upper tool retention member 68 provided on each of the upper support members 64 so as to be movable in the front-rear direction, and each of the upper tool retention members 68 retains the punch tool 12 by being engaged with the engagement hole 12h of the punch tool 12. The distal end side of each of the upper tool retention members 68 is shown as a round-bar shape, but the shape thereof is not limited to the round-bar shape and may be a hook shape. Each of the upper tool retention members 68 moves in the front-rear direction with respect to each of the upper support members 64 by way of driving of an air cylinder 70 as another front-rear moving actuator provided at an appropriate position of each of the upper support members 64.

A servo motor 72 as a left-right moving actuator for moving each of the upper tool change units 60 in the left-right direction is provided at an appropriate position of each of the upper unit main bodies 62. Further, each of the servo motors 72 includes an encoder 74 as a position detector for detecting a position in the left-right direction of each of the upper tool change units 60 (each of the upper tool retention members 68).

On the back side of the lower table 24, a lower beam member 76 extending in the left-right direction is provided via a plurality of brackets 78 (only one is shown). On the back surface of the lower beam member 76, a lower guide rail 80 extending in the left-right direction is provided. On the lower guide rail 80, a pair of lower tool change units 82, which change the die tools 14 with respect to the plurality of lower tool holders 40 and the lower stocker 52 positioned at the lower change position, are provided so as to be movable in the left-right direction. In other words, the pair of lower tool change units 82 are provided on the back side of the lower table 24 via the lower beam member 76 and the lower guide rail 80 so as to be movable in the left-right direction. Each of the lower tool change units 82 transports the die tool 14 between the lower tool holder 40 and the lower stocker 52 positioned at the lower change position.

Each of the lower tool change unit 82 has the same configuration as the known configuration shown in Patent Literature 1. Each of the lower tool change units 82 includes a lower unit main body 84 provided on the lower guide rail 80 so as to be movable in the left-right direction, and a lower support member 86 provided on the lower unit main body 84 so as to be movable in the front-rear direction and vertically. Each of the lower support members 86 moves in the front-rear direction with respect to each of the lower unit main bodies 84 by way of driving of an air cylinder 88 as a front-rear moving actuator provided at an appropriate position of each of the lower unit main bodies 84. Each of the lower support members 86 vertically moves with respect to each of the lower unit main bodies 84 by way of driving of an air cylinder 90 as a vertical moving actuator provided at an appropriate position of each of the lower unit main bodies 84.

Each of the lower tool change units 82 includes a lower tool retention member 92 provided on each of the lower support members 86 so as to be movable in the front-rear direction, and each of the lower tool retention members 92 retains the die tool 14 by being engaged with the engagement hole 14h of the die tool 14. The distal end side of each of the lower tool retention members 92 is shown as a round-bar shape, but the shape thereof is not limited to the round-bar shape and may be a hook shape. Each of the lower tool retention members 92 moves in the front-rear direction with respect to each of the lower support members 86 by way of driving of an air cylinder 94 as another front-rear moving actuator provided at an appropriate position of each of the lower support members 86.

A servo motor 96 as a left-right moving actuator for moving each of the lower tool change units 82 in the left-right direction is provided at an appropriate position of each of the lower unit main bodies 84. Further, each of the servo motors 96 includes an encoder 98 as a position detector for detecting a position in the left-right direction of each of the lower tool change units 82 (each of the lower tool retention members 92).

Subsequently, an operation related to the automatic change of the punch tool 12 (the die tool 14) will be briefly described.

When the punch tool 12 is transported from the upper tool holder 30 to the upper stocker 50 positioned at the upper change position, the upper tool change unit 60 is moved in the left-right direction by way of driving of the servo motor 72 so that the upper tool retention member 68 is opposed to the engagement hole 12h of the punch tool 12 mounted on the upper tool holder 30. Next, the upper tool retention member 68 is caused to retain the punch tool 12 while the upper tool retention member 68 is being engaged with the engagement hole 12h of the punch tool 12. Then, the upper tool change unit 60 is moved to the right by way of driving of the servo motor 72 so that the punch tool 12 is transported to the right and separated from the upper tool holder 30. Further, the upper tool change unit 60 is moved to the right by way of driving of the servo motor 72 so that the punch tool 12 is transported to the right and mounted on the upper stocker 50. After that, the upper tool retention member 68 is separated from the engagement hole 12h of the punch tool 12 so that the retention state of the punch tool 12 caused by the upper tool retention member 68 is released. Note that after the punch tool 12 is separated from the upper tool holder 30, the punch tool 12 may be moved to the back side (rear) of the upper table 26 by the upper tool change unit 60.

When the punch tool 12 is transported from the upper stocker 50 positioned at the upper change position to the upper tool holder 30, an operation opposite to the above operation is performed. As a result, the punch tool 12 mounted on the upper tool holder 30 and the punch tool 12 mounted on the upper stocker 50 can be automatically changed.

When the die tool 14 is transported between the lower tool holder 40 and the lower stocker 52 positioned at the lower change position, the same operation as the one described above is performed. As a result, the die tool 14 mounted on the lower tool holder 40 and the die tool 14 mounted on the lower stocker 52 can be automatically changed. Note that when the die tool 14 is installed in or removed from the lower tool holder 40 or the lower stocker 52, the die tool 14 may be vertically moved by the lower tool change unit 82.

Subsequently, a characterizing portion of the bending system 10 according to the present embodiment will be described.

Figure 3:
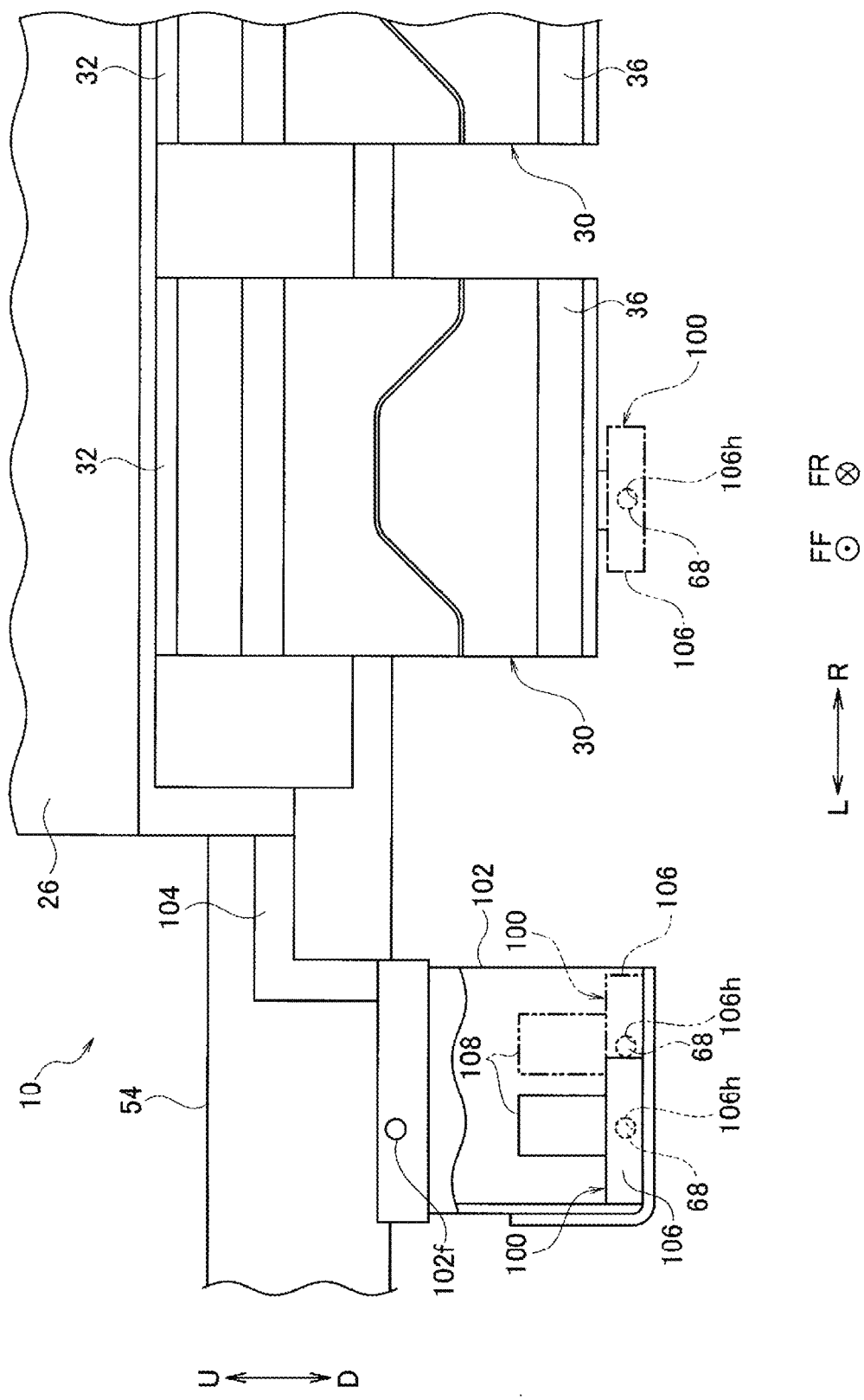
FIG. 3 is a schematic enlarged front view in the vicinity of a greasing unit holder that supports a greasing unit according to the present embodiment.

As shown in FIGS. 1 and 3, the bending system 10 includes a greasing unit 100 for supplying grease to the sliding contact part of each of the upper tool holders 30 and the sliding contact part of the upper joint block 44. The greasing unit 100 moves in the left-right direction by way of a moving operation of the upper tool retention member 68. On the left side (one side in the left-right direction) of the upper table 26, a greasing unit holder 102 that supports the greasing unit 100 is provided via a support arm 104. The greasing unit 100 is movable in the left-right direction between a standby position (a position shown by the solid line in FIG. 3) and a retention change position (a position shown by the alternate long and two short dashes line in FIG. 3) in the greasing unit holder 102. Then, the specific configuration of the greasing unit 100 will be described as follows.

As shown in FIGS. 3 to 6B, the greasing unit 100 includes a greasing unit main body 106, and a grease pool 106s that accommodates the grease is formed in the central part of the greasing unit main body 106. An engagement hole 106h for causing each of the upper tool retention members 68 to be engaged with is formed on the back surface (rear surface) of the greasing unit main body 106. Each of the upper tool retention members 68 retains the greasing unit 100 by being engaged with the engagement hole 106h of the greasing unit main body 106.

An application member 108 that applies the grease to the sliding contact part of each of the upper tool holders 30 and the sliding contact part of the upper joint block 44 is provided, via a plurality of attachment members 110 and the like, to the greasing unit main body 106. The application member 108 can be installed in and removed from the greasing unit main body 106. The application member 108 is made of a porous material such as a polyurethane sponge having open cells, felt, or the like so as to be able to be impregnated with the grease, and a part (lower end portion) of the application member 108 is positioned in the grease pool 106s of the greasing unit main body 106. Further, the application member 108 is formed in a shape (an approximate shape) corresponding to the sliding contact part of the upper tool holder 30. The application member 108 receives supply of the grease from a grease supply port 102f provided on the greasing unit holder 102. Further, the greasing unit 100 is configured such that, when each of the upper tool retention members 68 is inserted into the engagement hole 106h of the greasing unit main body 106, the grease impregnated in the application member 108 is applied to the outer circumferential surface on the distal end side of each of the upper tool retention members 68.

On both of the left and right sides of the application member 108 in the greasing unit main body 106, scrapers 112 that level the grease applied to the sliding contact part of each of the upper tool holders 30 and the sliding contact part of the upper joint block 44 are respectively provided via a plurality of attachment members 114 and the like. Each of the scrapers 112 is made of an elastic body such as synthetic rubber. Further, each of the scrapers 112 is formed in a shape (an approximate shape) corresponding to the sliding contact part of the upper tool holder 30, and can be installed in and removed from the greasing unit main body 106.

Figure 7:
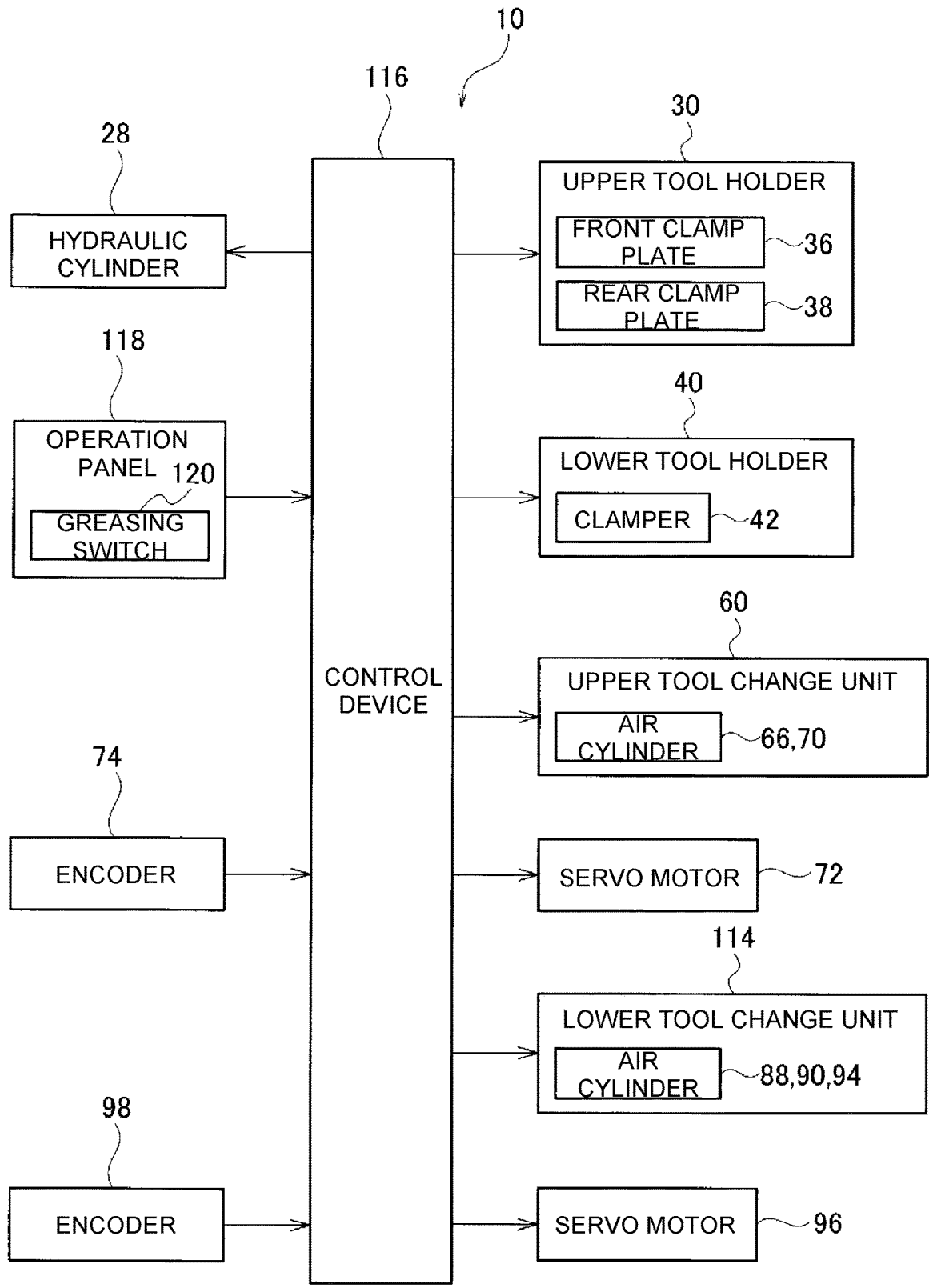
FIG. 7 is a control block diagram of the bending system according to the present embodiment.
Figure 8:
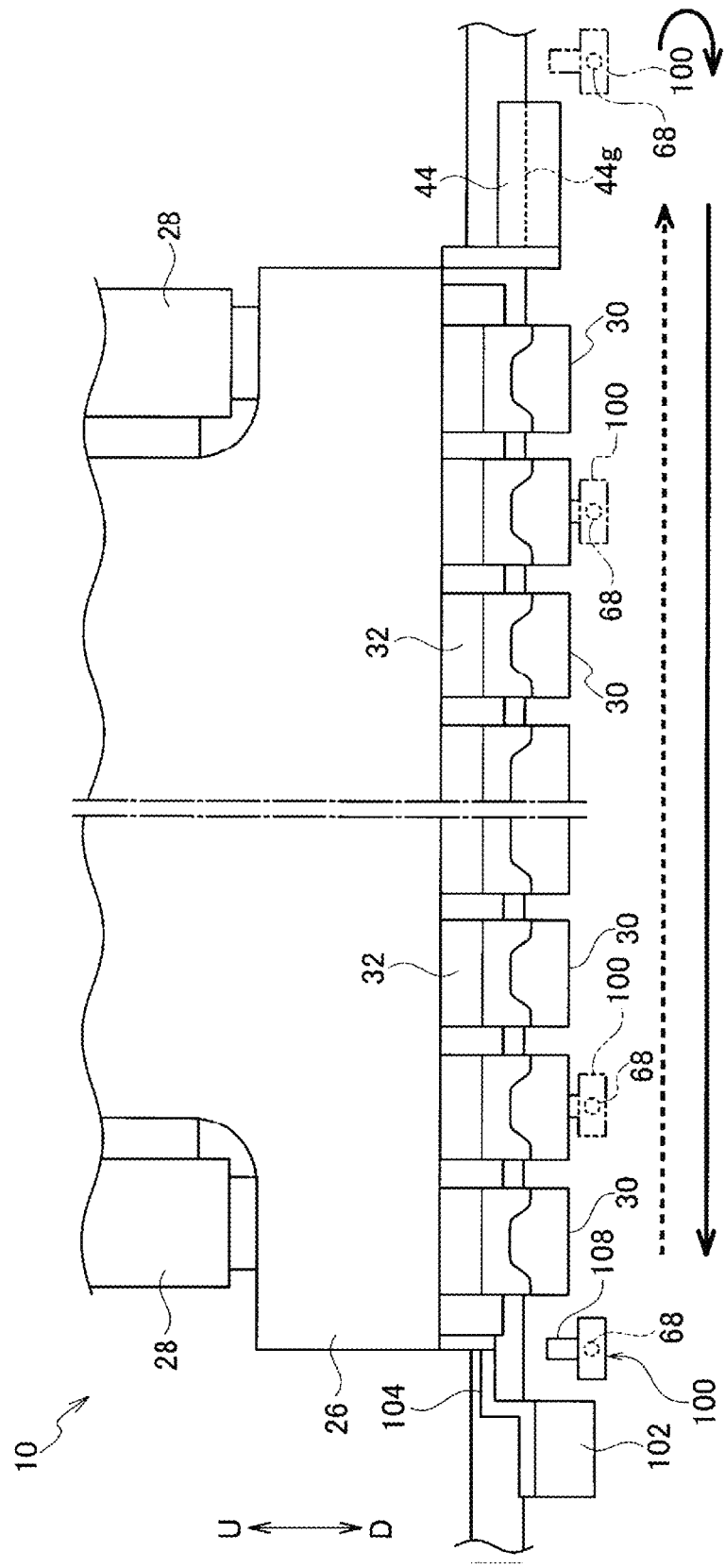
FIG. 8 is a diagram illustrating a greasing operation by a control device.

As shown in FIG. 7, the bending system 10 includes a control device 116 that controls the hydraulic cylinder 28 and the like on the basis of a processing program or the like. The control device 116 controls each of the upper tool change units 60, each of the servo motors 72, and the like, as described above, on the basis of a tool change program or the like. The control device 116 controls each of the upper tool change units 60, each of the servo motors 72, and the like, as will be described later, on the basis of a greasing program or the like. The control device 116 is composed of a computer, and includes a memory (not shown) that stores the processing program and the like, and a CPU (not shown) that executes the processing program and the like.

Each of the encoders 74, each of the encoders 98, and the like are connected to the control device 116. When controlling each of the servo motors 72 or each of the servo motors 96, the control device 116 monitors a detection result from each of the encoders 74 or each of the encoders 98. Further, an operation panel 118 is connected to the control device 116, and the operation panel 118 includes a greasing switch 120 for switching to a greasing mode in which the grease is supplied to the sliding contact part of each of the upper tool holders 30 or the like.

When the greasing switch 120 is pressed, the control device 116 executes a greasing operation for supplying the grease to the sliding contact part of each of the upper tool holders 30 or the like. The greasing operation includes a retention change operation (a grasping change operation) of the greasing unit 100 by the pair of upper tool retention members 68. Then, the specific content of the greasing operation by the control device 116 is as follows.

Figure 4:
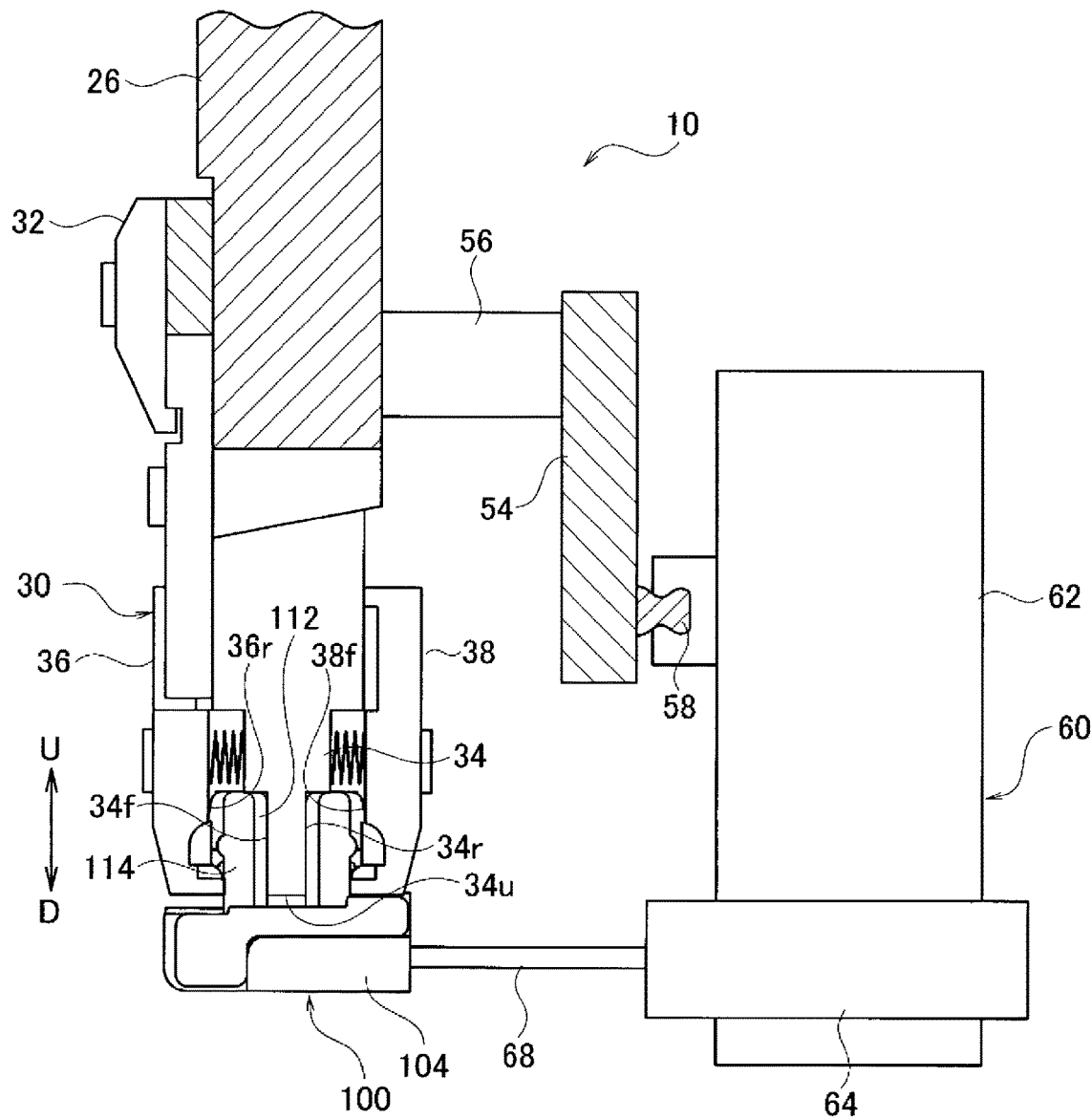
FIG. 4 is a cross-sectional view showing a state in which grease is supplied to a sliding contact part of an upper tool holder by using the greasing unit according to the present embodiment.
Figure 5A:
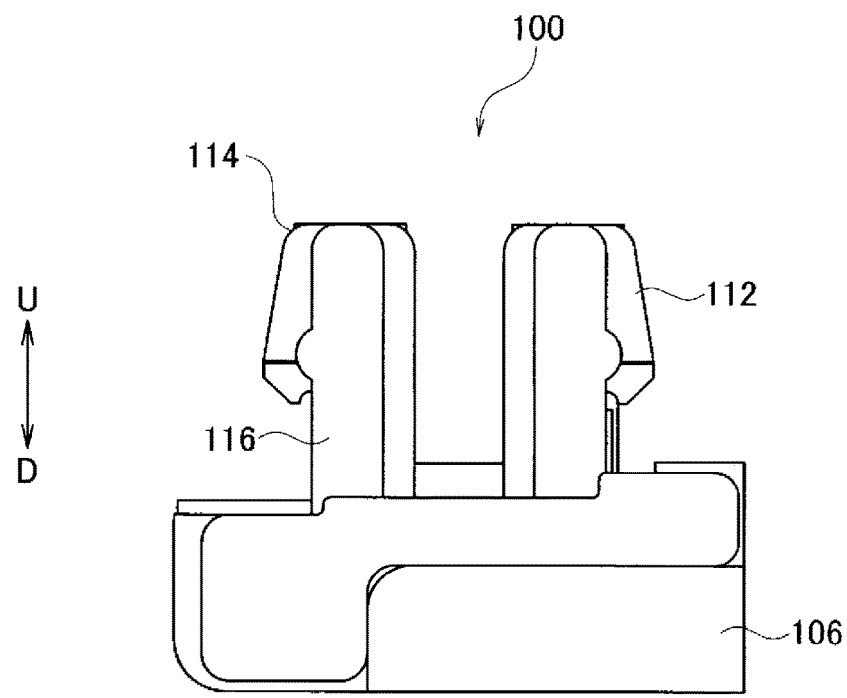
FIG. 5A is a right side view of the greasing unit according to the present embodiment.
Figure 5B:
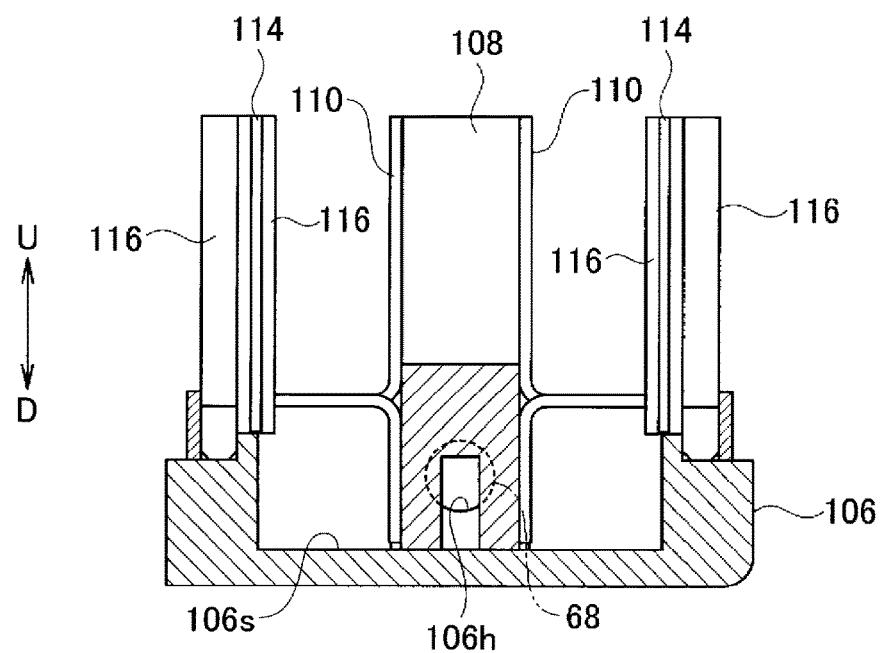
FIG. 5B is a front view of the greasing unit according to the present embodiment.
Figure 6A:
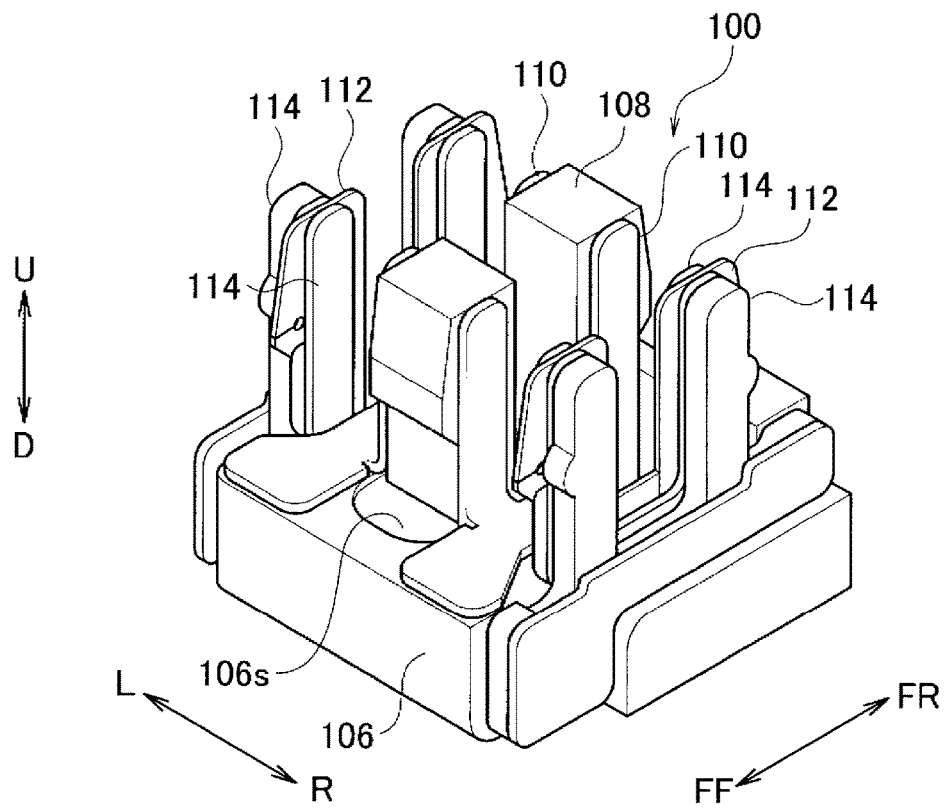
FIG. 6A is a front side perspective view of the greasing unit according to the present embodiment.
Figure 6B:
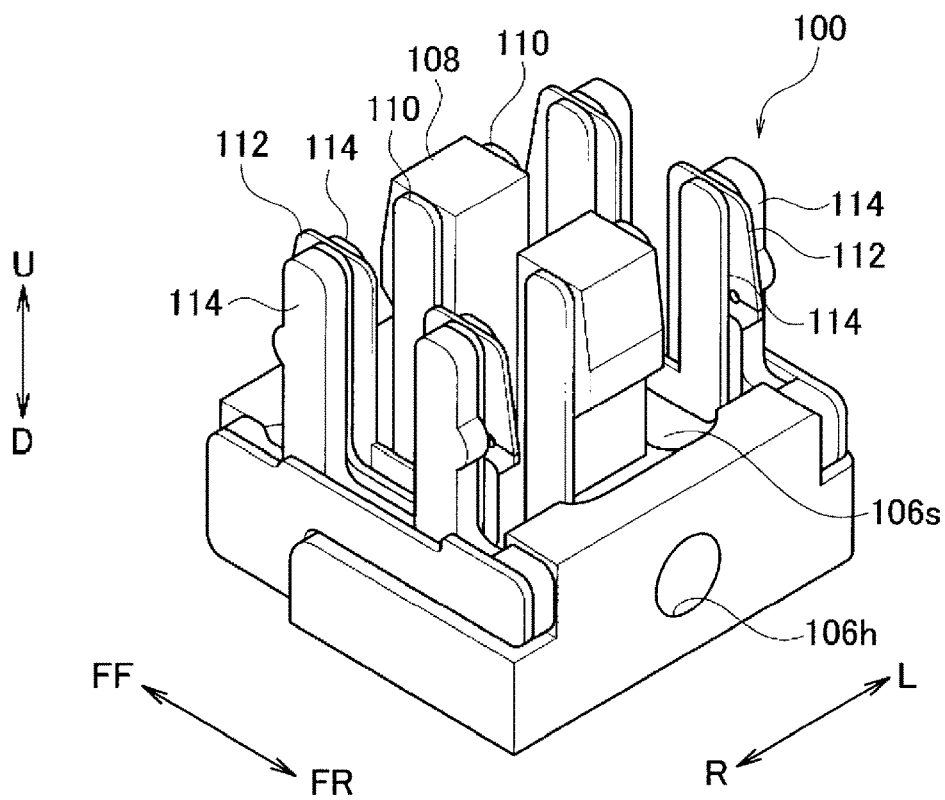
FIG. 6B is a back side perspective view of the greasing unit according to the present embodiment.

As shown in FIGS. 3, 4, and 7, the control device 116 controls the first servo motor 72 so that the upper tool retention member 68 of the first upper tool change unit 60 is positioned at the rear side of the engagement hole 106h of the greasing unit 100 that is positioned at the standby position in the greasing unit holder 102. Next, the control device 116 controls the first upper tool change unit 60 so that the upper tool retention member 68 of the first upper tool change unit 60 retains the greasing unit 100 by being engaged with the engagement hole 106h of the greasing unit 100. Then, the control device 116 controls the first servo motor 72 so that the greasing unit 100 is moved from the standby position and is positioned at the retention change position in the greasing unit holder 102.

After that, the control device 116 controls the first upper tool change unit 60 and the first servo motor 72 so that the retention state of the greasing unit 100 caused by the upper tool retention member 68 of the first upper tool change unit 60 is released and the first upper tool change unit 60 is separated from the greasing unit 100. Next, the control device 116 controls the second servo motor 72 so that the upper tool retention member 68 of the second upper tool change unit 60 is positioned at the rear side of the engagement hole 106h of the greasing unit 100. Then, the control device 116 controls the second upper tool change unit 60 so that the upper tool retention member 68 of the second upper tool change unit 60 retains the greasing unit 100 by being engaged with the engagement hole 106h of the greasing unit 100.

In other words, before the greasing unit 100 exits from the greasing unit holder 102, the control device 116 controls each of the upper tool change units 60 and each of the servo motors 72 so that a first retention change operation of the greasing unit 100 is executed by the pair of upper tool retention members 68 at the retention change position in the greasing unit holder 102.

As shown in FIGS. 3, 4, 7, and 8, after the execution of the first retention change operation of the greasing unit 100, the control device 116 controls the second servo motor 72 so that the greasing unit 100 exits from the greasing unit holder 102 and is positioned between the greasing unit holder 102 and the leftmost upper tool holder 30. Next, the control device 116 controls the second upper tool change unit 60 so that the greasing unit 100 moves backward (moves in the backward direction). Then, the control device 116 controls the second servo motor 72 so that the greasing unit 100 moves from the left side of the upper table 26 to the right side of the upper joint block 44 on the back side of the upper table 26. Note that the thick dotted arrow in FIG. 8 indicates that the greasing unit 100 is moving to the right on the back side of the upper table 26.

After that, the control device 116 controls the second upper tool change unit 60 so that the greasing unit 100 moves forward (moves in the forward direction) and is opposed to the sliding contact part of the upper joint block 44. Then, the control device 116 controls the second servo motor 72 so that the greasing unit 100 moves from the right side of the upper joint block 44 to the left side of the upper table 26 while the application member 108 is brought into contact with the sliding contact part of the upper tool holder 30 or the sliding contact part of the upper joint block 44 on the lower side of the upper table 26. Further, the control device 116 controls the second servo motor 72 so that the greasing unit 100 makes an entry into the greasing unit holder 102 and is positioned at the retention change position. Note that the circular arrow in FIG. 8 indicates that the greasing unit 100 is moving forward. The thick arrow in FIG. 8 indicates that the greasing unit 100 is moving to the left on the lower side of the upper table 26.

In other words, after the execution of the first retention change operation of the greasing unit 100, the control device 116 controls the second upper tool change unit 60 and the second servo motor 72 so that the greasing unit 100 applies the grease to the sliding contact part of the upper tool holder 30 and the sliding contact part of the upper joint block 44.

After the greasing unit 100 is positioned at the retention change position, the control device 116 controls the second upper tool change unit 60 and the second servo motor 72 so that the retention state of the greasing unit 100 caused by the upper tool retention member 68 of the second upper tool change unit 60 is released and the second upper tool change unit 60 is separated from the greasing unit 100. Next, the control device 116 controls the first servo motor 72 so that the upper tool retention member 68 of the first upper tool change unit 60 is positioned at the rear side of the engagement hole 106h of the greasing unit 100. Then, the control device 116 controls the first upper tool change unit 60 so that the upper tool retention member 68 of the first upper tool change unit 60 retains the greasing unit 100 by being engaged with the engagement hole 106h of the greasing unit 100.

After that, the control device 116 controls the first servo motor 72 so that the greasing unit 100 is moved from the retention change position and is positioned at the standby position in the greasing unit holder 102. Then, the control device 116 controls the first upper tool change unit 60 so that the retention state of the greasing unit 100 caused by the upper tool retention member 68 of the first upper tool change unit 60 is released.

In other words, after the greasing unit 100 makes an entry from the greasing unit holder 102, the control device 116 controls each of the upper tool change units 60 and each of the servo motors 72 so that a second retention change operation of the greasing unit 100 is executed by the pair of upper tool retention members 68 at the retention change position in the greasing unit holder 102.

Note that the control device 116 executes the unclamping operation of the plurality of front clamp plates 36 and the plurality of rear clamp plates 38 before executing the greasing operation. The control device 116 may control the second upper tool change unit 60 and the second servo motor 72 so that the greasing unit 100 moves from the left side of the upper table 26 to the right side of the upper joint block 44 while the application member 108 is brought into contact with the sliding contact part of the upper tool holder 30 or the sliding contact part of the upper joint block 44.

Subsequently, an action effect of the present embodiment will be described.

As described above, when the greasing switch 120 is pressed, the control device 116 controls each of the upper tool change units 60 and each of the servo motors 72 to execute the greasing operation. Therefore, the greasing unit 100 can be moved from the right side of the upper joint block 44 to the left side of the upper table 26 by way of the moving operation of the upper tool retention member 68 of the second upper tool change unit 60 while the application member 108 is brought into contact with the sliding contact part of the upper tool holder 30 or the sliding contact part of the upper joint block 44. As a result, the grease can be easily applied to the sliding contact part of each of the upper tool holders 30 and the sliding contact part of the upper joint block 44 while suppressing variation in a grease application state. Particularly, since the grease applied to the sliding contact part of each of the upper tool holders 30 and the sliding contact part of the upper joint block 44 is leveled by the scraper 112, it is possible to sufficiently suppress variation in the grease application state.

Further, as described above, the greasing unit 100 is configured such that the grease impregnated in the application member 108 is applied to the outer circumferential surface on the distal end side of each of the upper tool retention members 68 when each of the upper tool retention members 68 is inserted into the engagement hole 106h of the greasing unit main body 106. As a result, when the control device 116 executes the retention change operation of the greasing unit 100, the grease can be easily applied to each of the upper tool retention members 68.

Therefore, according to the present embodiment, it is possible to sufficiently prevent the sliding contact part of each of the upper tool holders 30 and the sliding contact part of the upper joint block 44 from being worn while simplifying the work of applying the grease to the sliding contact part of each of the upper tool holders 30, the sliding contact part of the upper joint block 44, and the outer circumferential surface on the distal end side of each of the upper tool retention members 68.

Modification of the Present Embodiment

Figure 9:
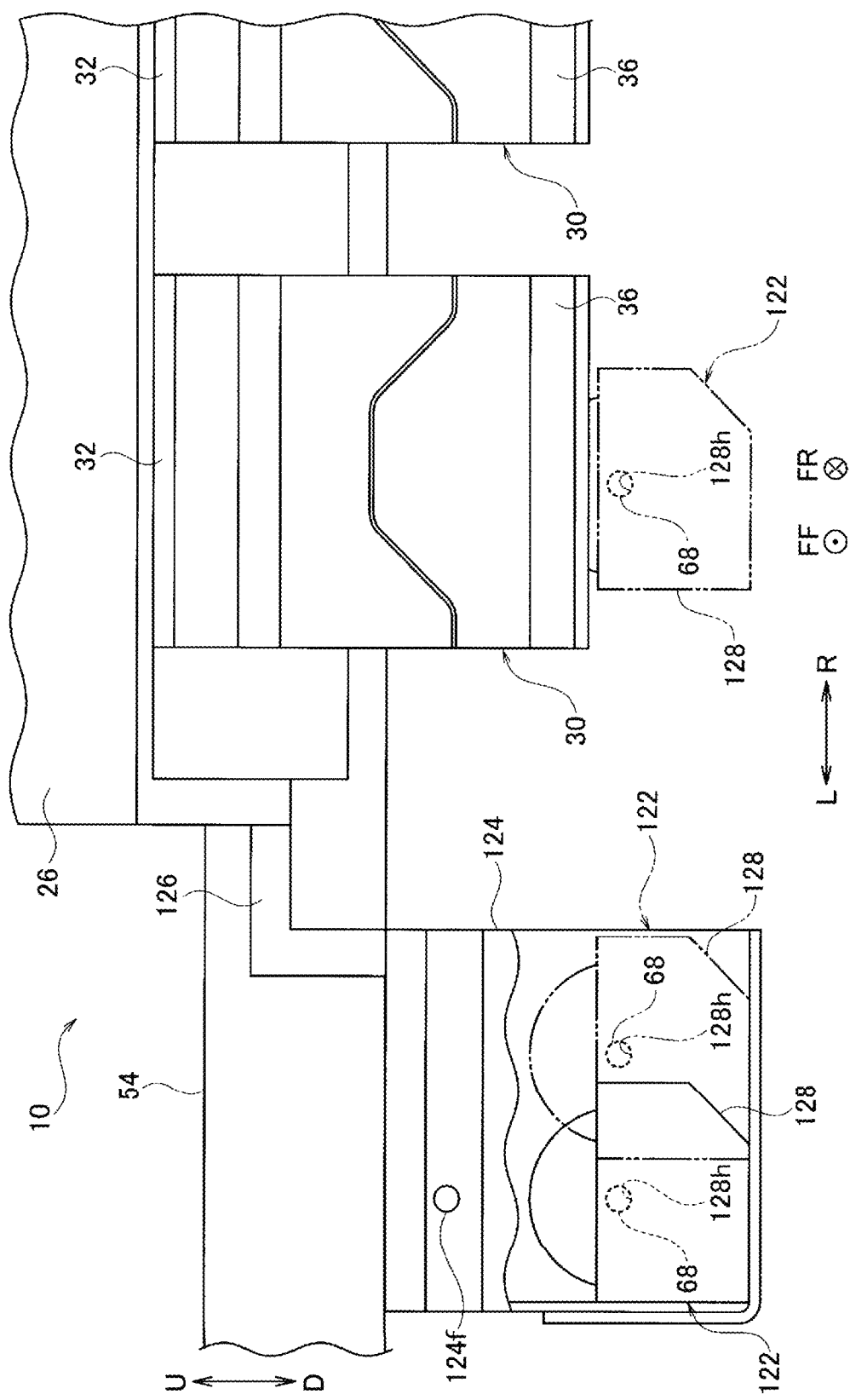
FIG. 9 is a schematic enlarged front view in the vicinity of a greasing unit holder that supports a greasing unit according to a modification of the present embodiment.
Figure 10:
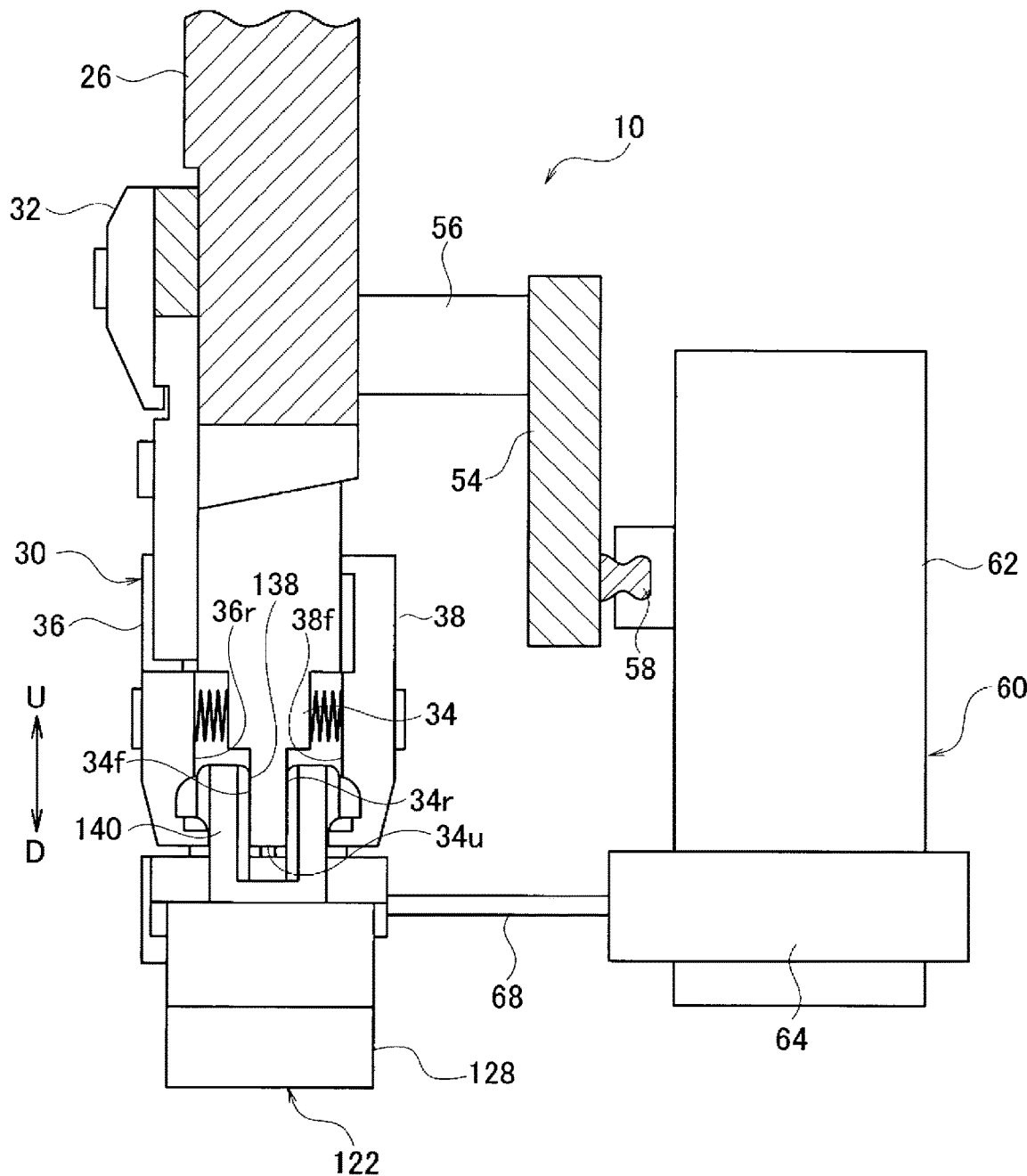
FIG. 10 is a cross-sectional view showing a state in which grease is supplied to a sliding contact part of an upper tool holder by using the greasing unit according to the modification of the present embodiment.

As shown in FIGS. 9 and 10, instead of the greasing unit 100 (see FIG. 1), the bending system 10 includes another greasing unit 122 for supplying grease to the sliding contact part of each of the upper tool holders 30 and the sliding contact part of the upper joint block 44. The greasing unit 122 moves in the left-right direction by way of the moving operation of the upper tool retention member 68. On the left side (one side in the left-right direction) of the upper table 26, a greasing unit holder 124 that supports the greasing unit 122 is provided via a support arm 126. The greasing unit 122 is movable in the left-right direction between a standby position (a position shown by the solid line in FIG. 9) and a retention change position (a position shown by the alternate long and two short dashes line in FIG. 9) in the greasing unit holder 124. Then, the specific configuration of the greasing unit 122 will be described as follows.

Figure 11A:
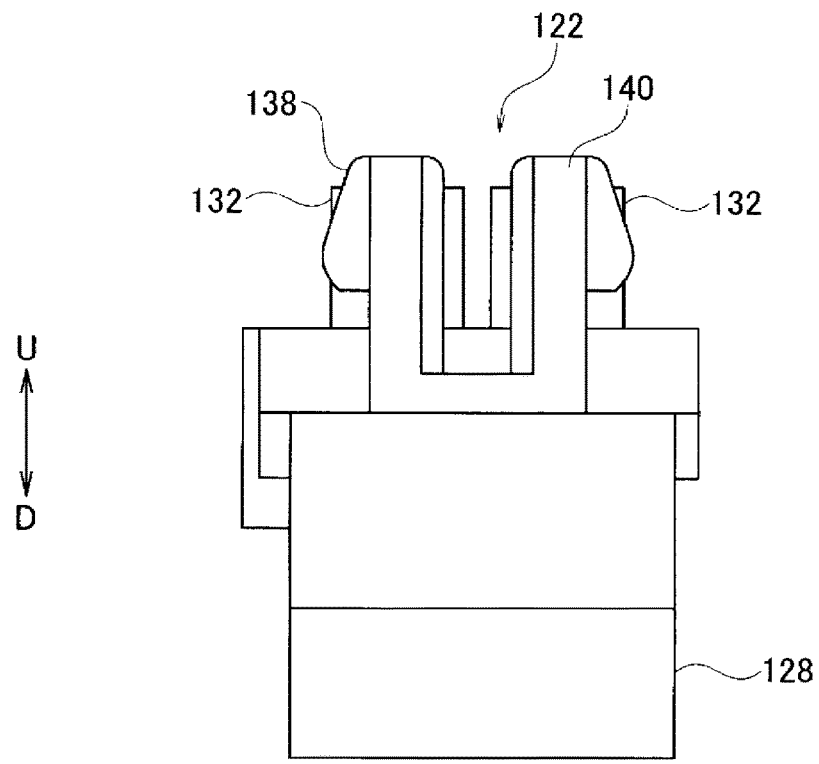
FIG. 11A is a right side view of the greasing unit according to the modification of the present embodiment.
Figure 11B:
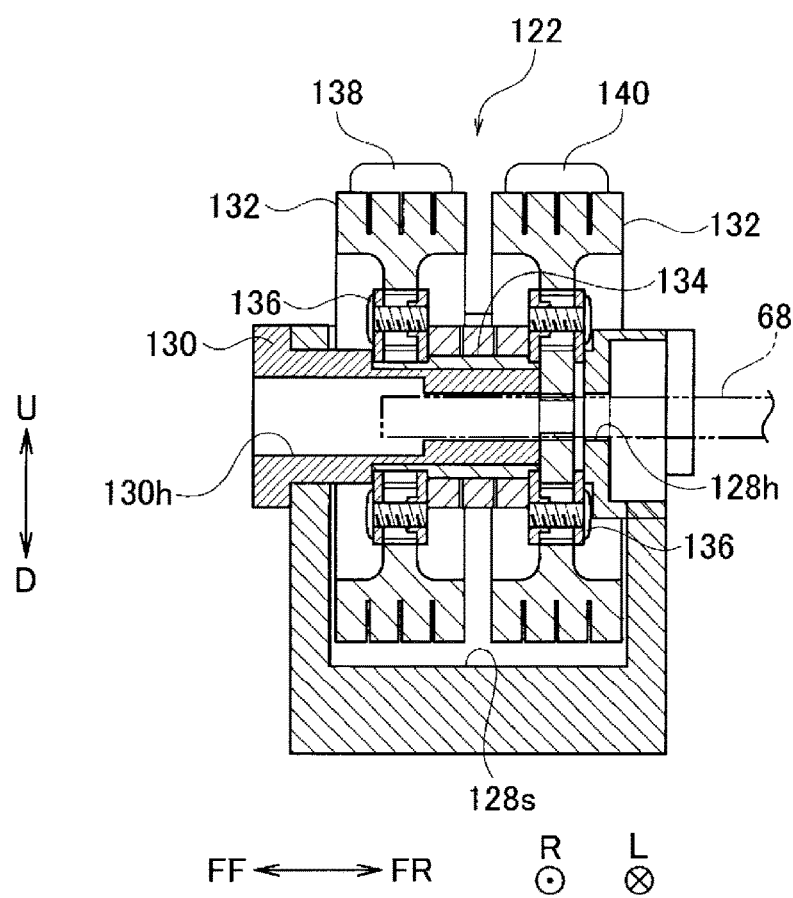
FIG. 11B is a side sectional view of the greasing unit according to the modification of the present embodiment.

As shown in FIGS. 11A and 11B, the greasing unit 122 includes a box-shaped greasing unit main body 128, and a grease pool 128s that accommodates the grease is formed in the greasing unit main body 128. An engagement hole 128h for causing each of the upper tool retention members 68 to be engaged with is formed on the back surface (rear surface) of the greasing unit main body 128. The greasing unit main body 128 includes a hollow support shaft 130 extending in the front-rear direction at the upper portion thereof, and an inner hole 130h of the support shaft 130 constitutes a part of the engagement hole 128h of the greasing unit main body 128. Each of the upper tool retention members 68 retains the greasing unit 122 by being engaged with the engagement hole 128h of the greasing unit main body 128 that includes the inner hole 130h of the support shaft 130.

Figure 12A:
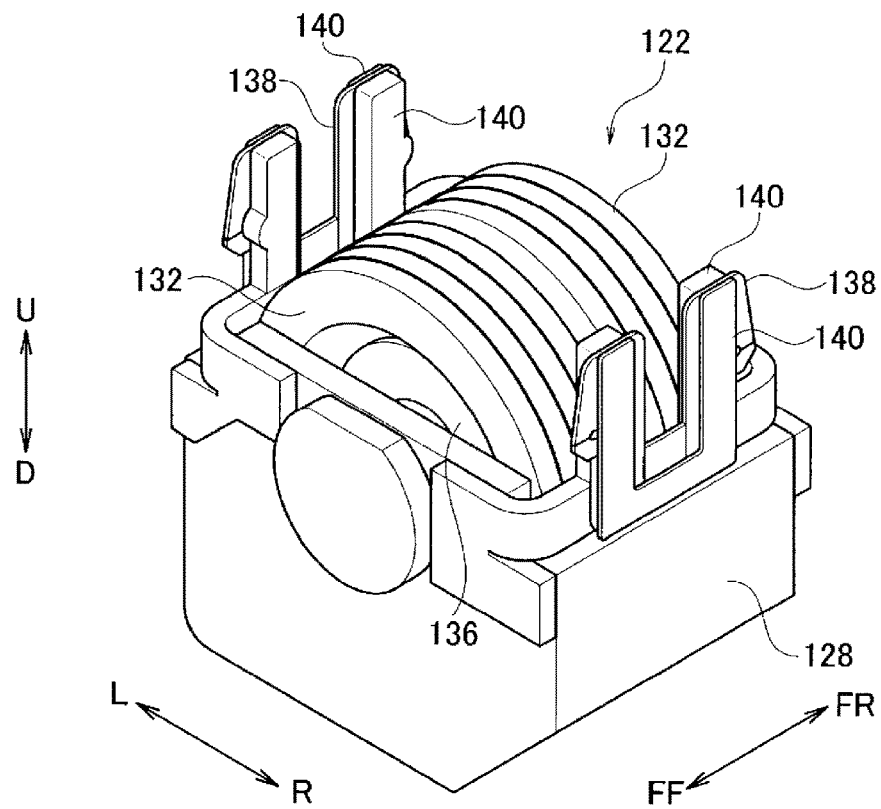
FIG. 12A is a front side perspective view of the greasing unit according to the modification of the present embodiment.
Figure 12B:
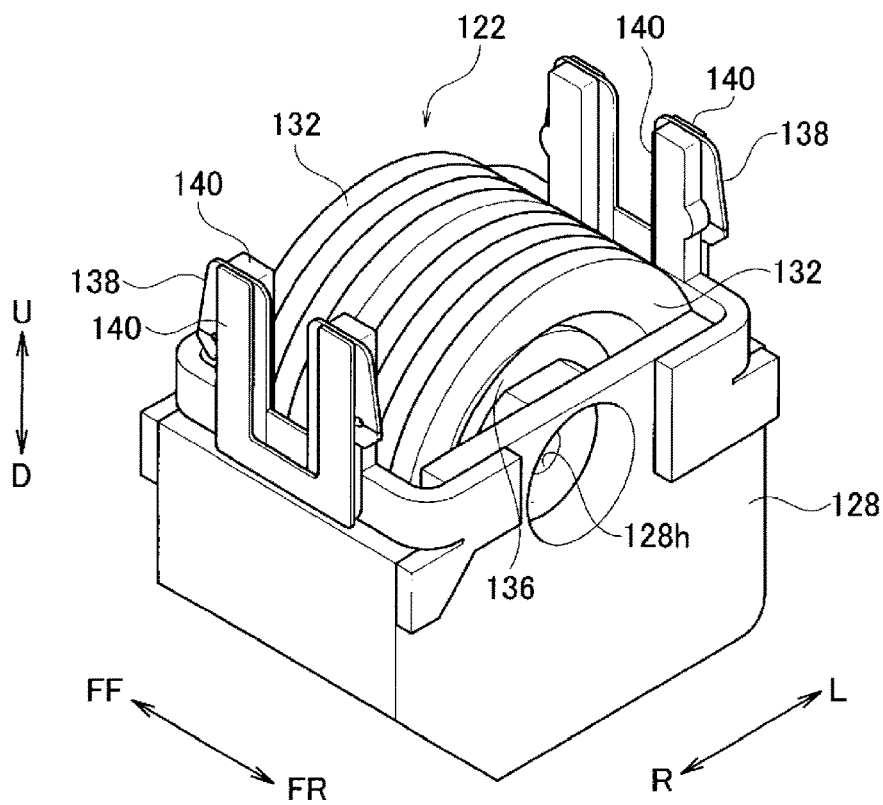
FIG. 12B is a back side perspective view of the greasing unit according to the modification of the present embodiment.

As shown in FIGS. 12A and 12B, a pair of circular application members 132 that apply the grease to the sliding contact part of each of the upper tool holders 30 and the sliding contact part of the upper joint block 44 is provided, via a bearing member 134, a plurality of attachment members 136, and the like, to the support shaft 130 that is a part of the greasing unit main body 128. Each of the application members 132 is rotatable around a horizontal shaft center via the bearing member 134 and the like, and can be installed in and removed from the greasing unit main body 128. Each of the application members 132 is made of a porous material such as a polyurethane sponge having open cells, felt, or the like so as to be able to be impregnated with the grease, and a part of each of the application members 132 is positioned in the grease pool 128s of the greasing unit main body 128. Further, the pair of application members 132 are each formed in a shape (an approximate shape) corresponding to the sliding contact part of the upper tool holder 30. Each of the application members 132 receives supply of the grease from a grease supply port 124f provided on the greasing unit holder 124. Further, the greasing unit 122 is configured such that, when each of the upper tool retention members 68 is inserted into the engagement hole 128h of the greasing unit main body 128, the grease impregnated in one of the application members 132 is applied to the outer circumferential surface on the distal end side of each of the upper tool retention members 68.

On both of the left and right sides of the application member 132 in the greasing unit main body 128, scrapers 138 that level the grease applied to the sliding contact part of each of the upper tool holders 30 and the sliding contact part of the upper joint block 44 are respectively provided via a plurality of attachment members 140 and the like. Each of the scrapers 138 is made of an elastic body such as synthetic rubber. Further, each of the scrapers 138 is formed in a shape (an approximate shape) corresponding to the sliding contact part of the upper tool holder 30, and can be installed in and removed from the greasing unit main body 128.

Note that the control device 116 (see FIGS. 6A and 6B) executes the greasing operation as described above by using the greasing unit 122. The greasing operation includes a retention change operation (grasping change operation) of the greasing unit 122 by the pair of upper tool retention members 68.

Then, even in the modification of the present embodiment, the same action effect as that of the above-described present embodiment is exhibited.

Note that the present disclosure is not limited to the description of the above-described embodiment, and can be implemented in various other aspects by making appropriate changes as follows.

Instead of the plurality of upper tool holders 30 arranged at intervals in the left-right direction, an upper tool holder extending in the left-right direction may be used as shown in Patent Literature 1. In this case, the application member 108 (132) and the scraper 112 (138) are each formed in a shape corresponding to the sliding contact part of the upper tool holder thereof.

Instead of providing the upper tool change unit 60 (the lower tool change unit 82) on the back side of the upper table 26 (the lower table 24) so as to be movable in the left-right direction, the upper tool change unit 60 (the lower tool change unit 82) may be provided on the front side of the upper table 26 (the lower table 24) so as to be movable in the left-right direction. In addition, instead of using the upper tool retention member 68 of the upper tool change unit 60 as an external operation member, a moving body provided on the back side or the front side of the upper table 26 so as to be movable in the left-right direction may be used as the external operation member. Further, instead of moving the greasing unit 100 (122) in the left-right direction by way of the moving operation of the external operation member such as the upper tool retention member 68 of the upper tool change unit 60, the greasing unit 100 (122) may be moved in the left-right direction by way of a manual operation by an operator.

In addition to supplying the grease to the sliding contact part of each of the upper tool holders 30 and the sliding contact part of the upper joint block 44, another greasing unit having the same configuration as that of the greasing unit 100 (122) may be used to supply grease to the sliding contact part of the lower tool holder 40 and the sliding contact part of the lower joint block 46.

Then, the scope of rights included in the present disclosure extends not only to the bending system 10 including the greasing unit 100 (122) but also to the greasing unit 100 (122) itself separated from the bending system 10.

The disclosure of the present application is related to the subject matter described in Japanese Patent Application No. 2019-187798 filed on Oct. 11, 2019, the entire disclosure of which is incorporated herein by reference.

The invention claimed is:

1. A bending system comprising:
a greasing unit configured to move in a lateral direction by way of a moving operation of an external operation member, the greasing unit configured to supply grease to a sliding contact part, the sliding contact part being a part of a tool holder of a press brake and the sliding contact part being in sliding contact with a tool; and
a greasing unit holder provided on a first side of a table of the press brake in the lateral direction, the greasing unit holder being configured to support the greasing unit, wherein
the greasing unit includes:
a greasing unit main body; and
an application member provided on the greasing unit main body, the application member being formed in a shape corresponding to the sliding contact part of the tool holder, the application member being configured to be able to be impregnated with the grease and the application member being configured to apply the grease to the sliding contact part of the tool holder.

2. The bending system according to claim 1, further comprising:
a tool change unit provided on a back side or a front side of the table so as to be movable in the lateral direction, the tool change unit including a tool retention member for retaining the tool by being engaged with an engagement hole of the tool, the tool change unit being configured to change the tool with respect to the tool holder; and
a moving actuator configured to move the tool change unit in the lateral direction, wherein
the engagement hole, being engaged with the tool retention member, is formed on the greasing unit main body, the external operation member being the tool retention member, the tool retention member being configured to retain the greasing unit by being engaged with the engagement hole of the greasing unit main body.

3. The bending system according to claim 2, wherein the greasing unit is configured such that, when the tool retention member is inserted into the engagement hole of the greasing unit main body, the grease that is impregnated in the application member is applied to the tool retention member.

4. The bending system according to claim 2, further comprising a control device configured to control the tool change unit and the moving actuator such that while the application member is brought into contact with the sliding contact part of the tool holder, the greasing unit moves to a second side of the table in the lateral direction from the first side of the table in the lateral direction or moves from the second side of the table in the lateral direction to the first side of the table in the lateral direction.

5. The bending system according to claim 1, further comprising:
a pair of tool change units, each of the tool change units provided on a back side or a front side of the table so as to be movable in the lateral direction, each of the tool change units including a tool retention member for retaining the tool by being engaged with an engagement hole of the tool, each of the tool change units being configured to change the tool with respect to the tool holder; and
moving actuators each configured to move respective one of the tool change units in the lateral direction, wherein
the engagement hole, being engaged with each of the tool retention members, is formed on the greasing unit main body, the external operation member is each of the tool retention members, each of the tool retention members being configured to retain the greasing unit by being engaged with the engagement hole of the greasing unit main body,
the greasing unit is configured such that, when the tool retention member is inserted into the engagement hole of the greasing unit main body, the grease that is impregnated in the application member is applied to each of the tool retention members, and
a control device is further provided, the control device being configured to control each of the tool change units and each of the moving actuators such that a retention change operation of the greasing unit is executed by the pair of the tool retention members in the greasing unit holder.

6. The bending system according to claim 1, wherein the greasing unit includes a scraper provided on the greasing unit main body and the greasing unit is formed in a shape corresponding to the sliding contact part of the tool holder, the scraper being configured to level the grease applied to the sliding contact part of the tool holder.

7. The bending system according to claim 1, wherein the application member is configured to be rotatable around a horizontal shaft center.

8. The bending system according to claim 1, wherein a grease pool configured to accommodate the grease is formed in the greasing unit main body, and a part of the application member is positioned in the grease pool.

* * * * *